United States Patent
Ichihashi

(10) Patent No.: US 9,224,075 B2
(45) Date of Patent: Dec. 29, 2015

(54) IMAGE FORMING APPARATUS

(71) Applicant: KYOCERA Document Solutions Inc., Osaka (JP)

(72) Inventor: Takao Ichihashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/693,146

(22) Filed: Apr. 22, 2015

(65) Prior Publication Data

US 2015/0310315 A1    Oct. 29, 2015

(30) Foreign Application Priority Data

Apr. 25, 2014    (JP) .................................. 2014-091210

(51) Int. Cl.
| | | |
|---|---|---|
| *G06K 15/00* | (2006.01) | |
| *G06K 15/16* | (2006.01) | |
| *B65H 1/04* | (2006.01) | |
| *B65H 7/20* | (2006.01) | |
| *B65H 29/58* | (2006.01) | |
| *B65H 31/24* | (2006.01) | |
| *B65H 43/02* | (2006.01) | |
| *B65H 37/00* | (2006.01) | |
| *B65H 1/28* | (2006.01) | |

(52) U.S. Cl.
CPC *G06K 15/16* (2013.01); *B65H 1/04* (2013.01); *B65H 1/28* (2013.01); *B65H 7/20* (2013.01); *B65H 29/58* (2013.01); *B65H 31/24* (2013.01); *B65H 37/00* (2013.01); *B65H 43/02* (2013.01); *G06K 15/002* (2013.01)

(58) Field of Classification Search
USPC ................ 358/1.12, 1.15, 1.1, 1.4, 1.11–1.18
See application file for complete search history.

(56) References Cited

U.S. PATENT DOCUMENTS

| | | | | |
|---|---|---|---|---|
| 5,889,594 A * | 3/1999 | Maekawa | ............. | G03G 15/231 355/24 |
| 8,229,315 B2 * | 7/2012 | Sakai | ................... | G03G 15/234 399/85 |
| 8,427,687 B2 * | 4/2013 | Toizumi | ................ | G06F 3/1219 358/1.12 |
| 8,746,685 B1 * | 6/2014 | Fukuzawa | ............... | B65H 29/58 271/184 |

FOREIGN PATENT DOCUMENTS

JP    2005-191873 A    7/2005

* cited by examiner

*Primary Examiner* — Allen H Nguyen
(74) *Attorney, Agent, or Firm* — Studebaker & Brackett PC

(57) ABSTRACT

In an image forming apparatus, an operation control section controls a sheet conveyance section to eject, onto an exit tray, sheets on which images of an even number page group have been formed on respective first sides thereof. A reception section receives input from a user indicating whether the sheets ejected onto the exit tray after the images have been formed on the first sides thereof are new sheets having unused second sides or reused sheets having used second sides. When the ejected sheets are the new sheets, the operation control section controls an image forming section to form images of an odd number page group on the second sides of the new sheets after the new sheets have been loaded onto a manual feed tray.

7 Claims, 11 Drawing Sheets

IMAGE FORMING APPARATUS

INCORPORATION BY REFERENCE

The present application claims priority under 35 U.S.C. §119 to Japanese Patent Application No. 2014-091210, filed Apr. 25, 2014. The contents of this application are incorporated herein by reference in their entirety.

BACKGROUND

The present disclosure relates to an image forming apparatus and in particular relates to a technique for reducing wasteful consumption of sheets of paper due to printing errors during duplex printing.

In order to reduce costs and effectively reuse resources, it is common practice to load sheets of paper on which simplex printing has already been performed (referred to below as reused sheets) into a specific one of a plurality of paper feed cassettes in an image forming apparatus, and to print on unprinted sides of the reused sheets. Unfortunately, the paper feed cassette in which the reused sheets are stored may be mistakenly selected when performing duplex printing for which it is necessary to use sheets of paper on which printing has not been performed on either side thereof (referred to below as new sheets). In such a situation, printing is performed on the sides of the reused sheets on which printing has already been performed, resulting in wasteful consumption of sheets of paper.

Various techniques have been disclosed in relation to the problem described above. For example, each paper feed cassette may be set in advance as either storing new sheets or reused sheets. With respect to the above configuration, a technique has been disclosed of when an instruction for duplex printing is received, performing simplex printing instead of duplex printing if the instruction indicates a sheet feed cassette that is set as storing reused sheets therein. The above technique can prevent printing from being mistakenly performed on the sides of reused sheets on which printing has already been performed and thus can reduce wasteful consumption of sheets of paper due to printing errors during duplex printing.

SUMMARY

An image forming apparatus according to one aspect of the present disclosure includes a sheet feed section, a sheet conveyance section, a reception section, an image forming section, an exit tray, and an operation control section. The sheet feed section includes a sheet feed cassette and a manual feed tray. The sheet feed section feeds a sheet stored in the sheet feed cassette or a sheet loaded onto the manual feed tray. The sheet conveyance section conveys the sheet fed by the sheet feed section. The sheet conveyance section includes a sheet reversing mechanism for reversing sides (front and rear sides) of the sheet. The reception section receives input pertaining to image formation. The image forming section forms an image on the sheet based on image data indicated by an image formation instruction received by the reception section. The sheet is ejected onto the exit tray after the image has been formed thereon by the image forming section. The operation control section controls operation of the paper feed section, the sheet conveyance section, and the image forming section. When the reception section receives an instruction for duplex image formation that indicates the sheet feed cassette, the operation control section performs the following controls. The operation control section controls the sheet feed section to feed one or more sheets from the sheet feed cassette. The operation control section controls the image forming section to form images on respective first sides of the sheets based on image data of one group out of an even number page group and an odd number page group among image data indicated by the instruction received by the reception section. The operation control section controls the sheet conveyance section to eject the sheets onto the exit tray after the images have been formed on the first sides thereof by the image forming section. The reception section receives input from a user indicating whether the sheets ejected onto the exit tray after the images have been formed on the first sides thereof are new sheets having unused second sides or reused sheets having used second sides. When the reception section receives input indicating that the sheets ejected onto the exit tray are the new sheets having the unused second sides and the operation control section determines that the sheets ejected onto the exit tray have been loaded onto the manual feed tray, the operation control section performs the following control. The operation control section controls the sheet feed section to feed the sheets loaded onto the manual feed tray. The operation control section controls the image forming section to form images on the second sides of the sheets fed from the manual feed tray based on image data of the other group out of the even number page group and the odd number page group among the image data indicated by the instruction received by the reception section. The operation control section controls the sheet conveyance section to eject the sheets onto the exit tray after the images have been formed on the second sides thereof by the image forming section.

DETAILED DESCRIPTION

Figure 1:
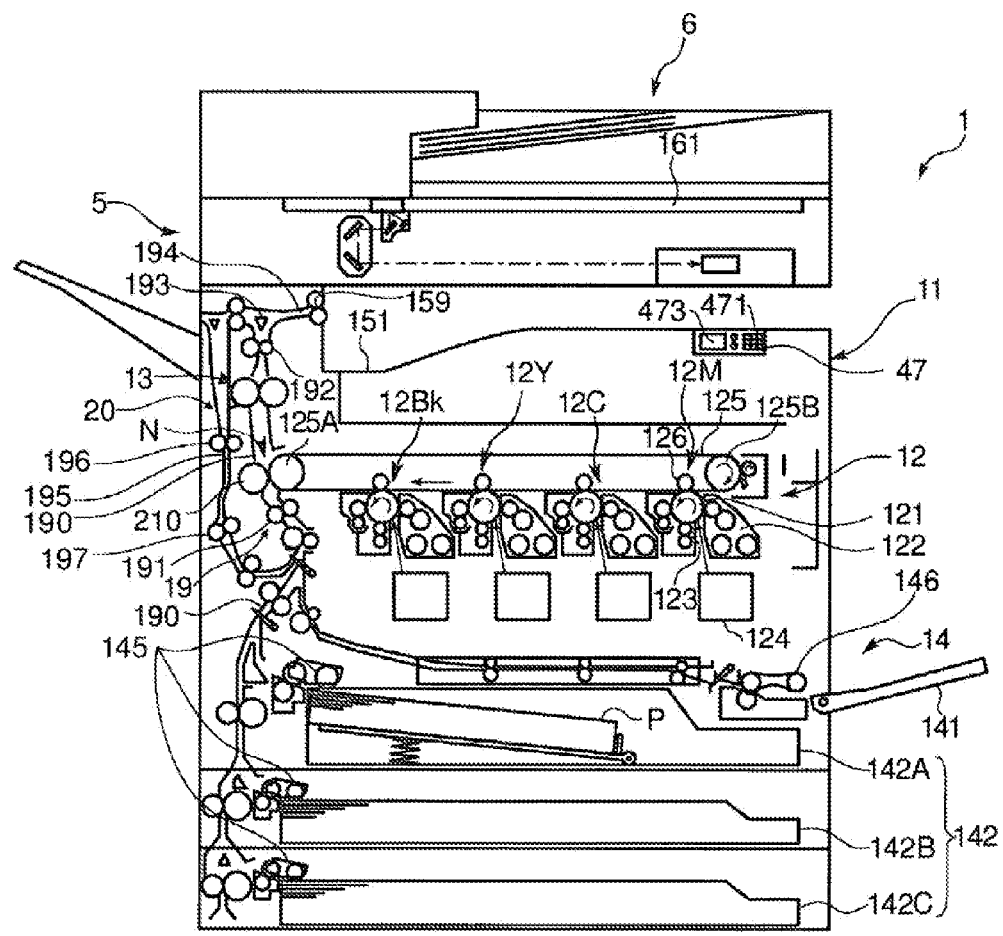
FIG. 1 illustrates the structure of an image forming apparatus according to an embodiment of the present disclosure.

The following explains an image forming apparatus according to an embodiment of the present disclosure with reference to the drawings. FIG. 1 illustrates the structure of the image forming apparatus according to the embodiment of the present disclosure.

An image forming apparatus 1 according to the embodiment of the present disclosure is for example a multifunction peripheral that has a plurality of functions such as a copying function, a printing function, a scanning function, and a facsimile function. The image forming apparatus 1 includes an apparatus body 11, an image forming section 12, a fixing section 13, a sheet feed section 14, a sheet conveyance section 19, a document scanning section 5, and a document feed section 6.

During an image scanning operation by the image forming apparatus 1, the document scanning section 5 generates image data by optically scanning an image of a document. The aforementioned document is a document that is fed by the document feed section 6 or a document that is loaded onto document loading glass 161.

During an image forming operation by the image forming apparatus 1, the image forming section 12 forms an image on a sheet P based, for example, on image data. The aforementioned image data is for example the image data that is generated through the aforementioned document scanning operation or image data that is received from a computer connected to the image forming apparatus 1 via a network. The sheet P is fed by the sheet feed section 14 and is conveyed by the sheet conveyance section 19.

The sheet feed section 14 includes sheet feed cassettes 142 that are freely detachable from the apparatus body 11. In the example illustrated in FIG. 1, the sheet feed section 14 includes three sheet feed cassettes 142A, 142B, and 142C. A sheet feed roller 145 is located above each of the sheet feed cassettes 142A, 142B, and 142C. The sheet feed roller 145 picks up a sheet stored in a corresponding one of the sheet feed cassettes 142A, 142B, and 142C, and feeds the sheet P toward a conveyance path 190. The sheet feed section 14 also includes a manual feed tray 141 that is attached to a wall surface of the apparatus body 11 such as to be freely openable and closeable. A sheet P loaded onto the manual feed tray 141 is picked up and conveyed toward the conveyance path 190 by a sheet feed roller 146.

The sheet conveyance section 19 includes conveyance roller pairs 191 and 192 that are located at appropriate positions along the conveyance path 190. The conveyance roller pairs 191 and 192 convey a sheet P that is fed from the sheet feed section 14 along the conveyance path 190.

The image forming section 12 includes image forming units 12M, 12C, 12Y, and 12Bk that each include a photosensitive drum 121, a developing device 122, a toner cartridge (not illustrated), a charger 123, a light exposure device 124, and a primary transfer roller 126. The developing device 122 supplies toner to the photosensitive drum 121. The toner cartridge stores toner therein.

During color printing, the image forming unit 12M for magenta, the image forming unit 12C for cyan, the image forming unit 12Y for yellow, and the image forming section 12Bk for black in the image forming section 12 each form a toner image on the corresponding photosensitive drum 121 based on image data for a corresponding color component, among color components configuring image data, through charging, light exposure, and developing processes. The toner images formed by the image forming units 12M, 12C, 12Y, and 12Bk are each transferred by the corresponding primary transfer roller 126 onto an intermediate transfer belt 125 that is stretched around a drive roller 125A and a driven roller 125B.

An outer circumferential surface of the intermediate transfer belt 125 is an image bearing surface onto which the toner images are transferred. The intermediate transfer belt 125 is driven by the drive roller 125A in a state of contact with respective circumferential surfaces of the photosensitive drums 121. The intermediate transfer belt 125 circulates continuously between the drive roller 125A and the driven roller 125B in synchronization with each of the photosensitive drums 121.

The toner images of the various colors that are transferred onto the intermediate transfer belt 125 are superposed on one another on the intermediate transfer belt 125 such as to form a color toner image. A secondary transfer roller 210 transfers the color toner image that is formed on the surface of the intermediate transfer belt 125, onto a sheet P that is conveyed by the conveyance roller pair 191. The secondary transfer roller 210 transfers the toner image onto the sheet P in a nip N where the intermediate transfer belt 125 is sandwiched between the secondary transfer roller 210 and the drive roller 125A. The fixing section 13 subsequently fixes the toner image to the sheet P through thermal fixing. After the fixing process has been completed on the sheet P, the sheet P passes along an ejection conveyance path 194 (a section of the conveyance path 190) and is ejected onto an exit tray 151 by an ejection roller pair 159. The ejection conveyance path 194 extends upwards from the fixing section 13.

The image forming apparatus 1 has two operating modes—normal mode and printing error checking mode—for a duplex printing operation in which images are formed on both sides of a sheet P. Switching between the two operating modes is performed based on an instruction received from a user by a reception section 103 (refer to FIG. 3) of a control unit 10 which is explained further below. The normal mode is an operating mode in which duplex printing is performed in the same manner as duplex printing in a generic image forming apparatus. The printing error checking mode is an operating mode in which operations are performed as described below. First, sheets P having images formed on respective first sides thereof based on image data of one group out of an even number page group and an odd number page group are ejected onto the exit tray 151. Next, the user checks whether the sheets P are new sheets or reused sheets. Based on the result of the aforementioned check, images are either formed on the new sheets or other reused sheets based on image data of the other group out of the even number page group and the odd number page group. The printing error checking mode is explained in more detail further below, but first operation in the normal mode is explained.

Figure 2A:
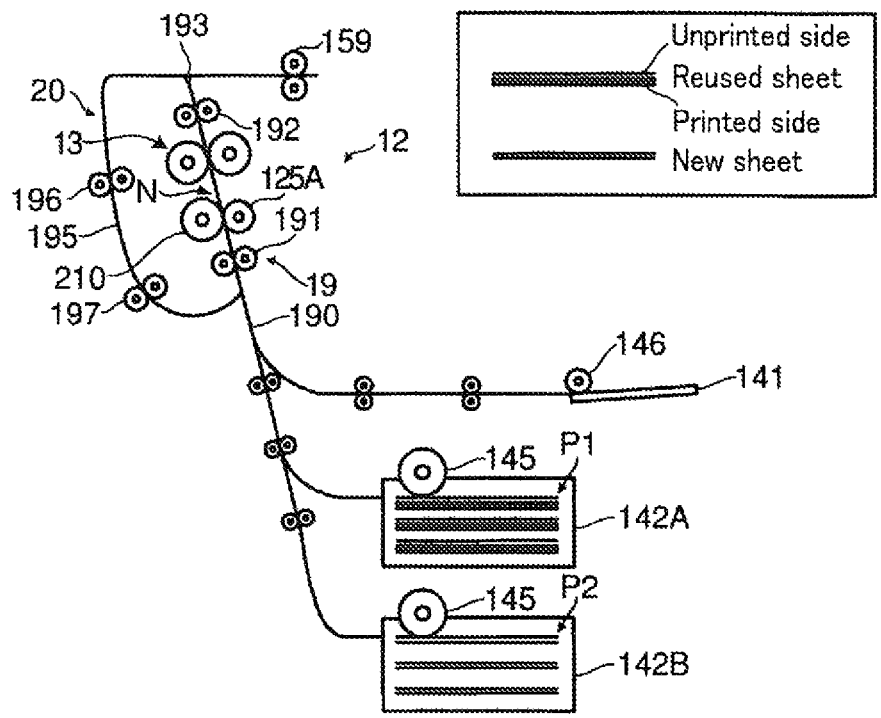
FIG. 2A illustrates the structure of a sheet feed section and a sheet conveyance section of the image forming apparatus according to the embodiment of the present disclosure.
Figure 2B:
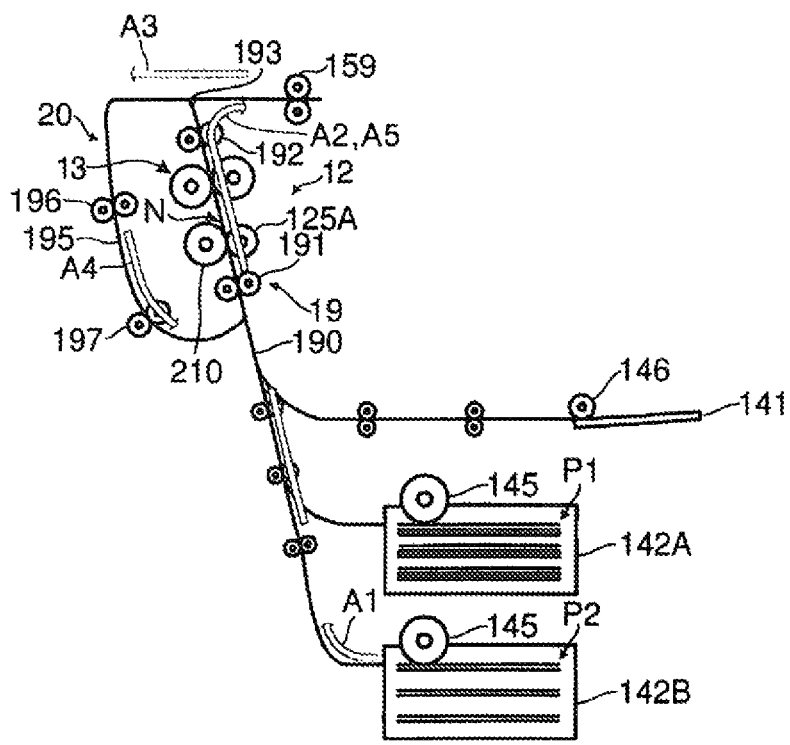
FIG. 2B illustrates the movement of sheets in a normal mode.

FIG. 2A illustrates the structure of the sheet feed section 14 and the sheet conveyance section 19. FIG. 2B illustrates the movement of sheets P in the normal mode. In the example illustrated in FIGS. 2A and 2B, reused sheets P1 are stored in the sheet feed cassette 142A and new sheets P2 are stored in the sheet feed cassette 142B. The reused sheets P1 are sheets on which simplex printing has already been performed. The new sheets P2 are sheets on which printing has not been performed on either side thereof. In the normal mode, a sheet P is picked up from the sheet feed cassette 142B, which is indicated by an image formation instruction received by the reception section 103, and is fed toward the conveyance path 190 by the corresponding sheet feed roller 145 (arrow A1 in FIG. 2B) under the control of an operation control section 101 (refer to FIG. 3) of the control unit 10 which is explained further below. In the example illustrated in FIG. 2B, the sheet feed cassette 142 that is indicated by the image formation instruction is the sheet feed cassette 142B. Therefore, in the example illustrated in FIG. 2B, the sheet P is a new sheet P2. The image forming section 12 subsequently forms an image on a first side of the new sheet P2 based on image data of an even number page among image data indicated by the image formation instruction received by the reception section 103. After a fixing process has been performed, the new sheet P2 becomes sandwiched in a nip between the ejection roller pair 159 which is located next to the exit tray 151 (arrow A2 in FIG. 2B). The sheet conveyance section 19 includes a sheet reversing mechanism 20 for reversing sides of a sheet. The ejection roller pair 159 is one part of the sheet reversing mechanism 20 and causes switching back of the new sheet P2 (arrow A3 in FIG. 2B). A conveyance diverging guide 193 is provided in the conveyance path 190. Once the new sheet P2 has been switched back by the ejection roller pair 159, the new sheet P2 is fed into a reverse conveyance path 195 by the conveyance diverging guide 193 (arrow A4 in FIG. 2B). The reverse conveyance path 195 is a section of the conveyance path 190 that diverges from the ejection conveyance path 194. The new sheet P2 is conveyed back to a position upstream of the nip N and the fixing section 13 in terms of a sheet conveyance direction by conveyance roller pairs 196 and 197 that are located along the reverse conveyance path 195. Next, the image forming section 12 forms an image on a second side of the new sheet P2 (arrow A5 in FIG. 2B). Once duplex printing on the new sheet P2 is complete, the new sheet P2 is ejected onto the exit tray 151 by the ejection roller pair 159.

Figure 3:
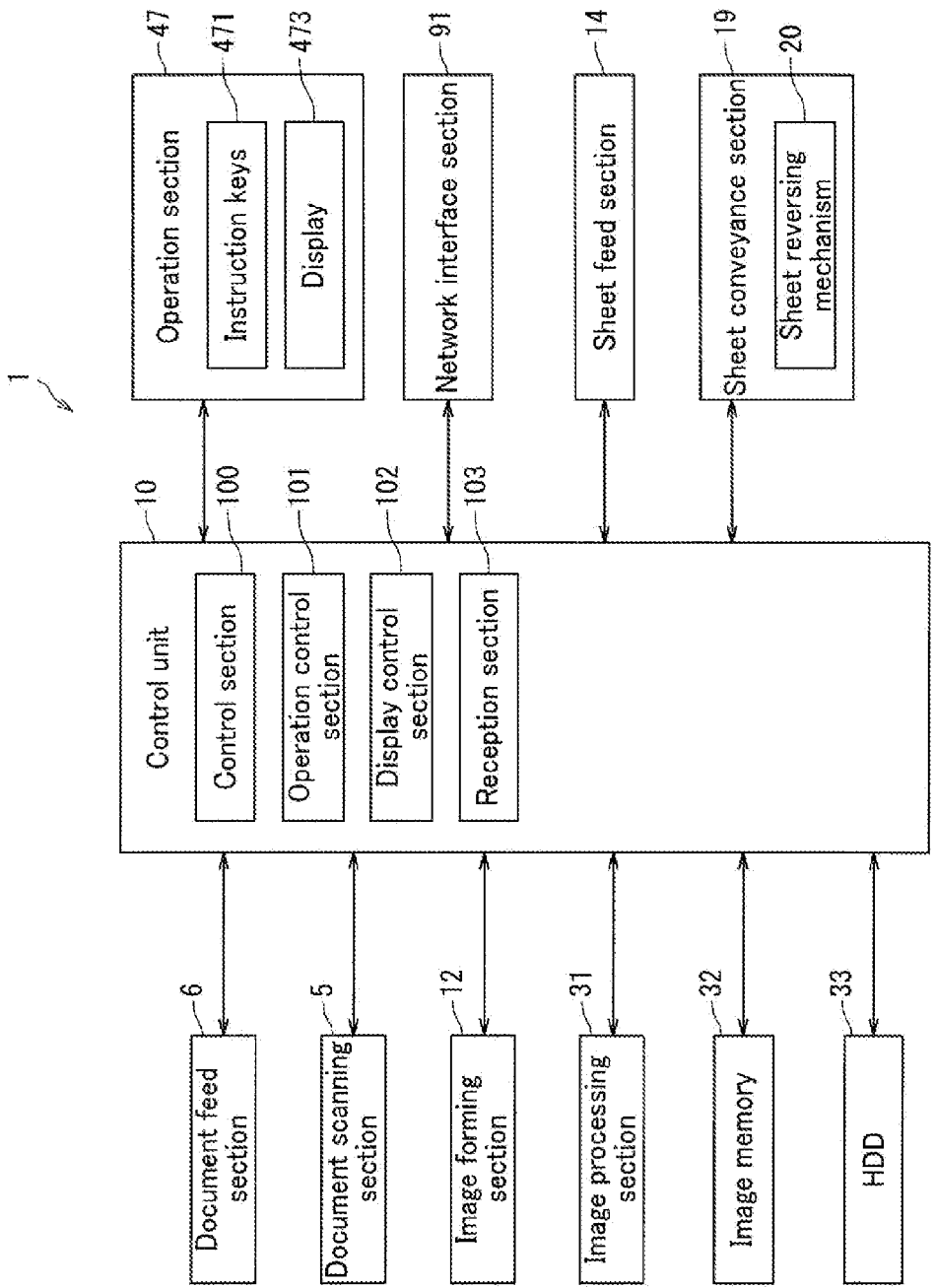
FIG. 3 is a block diagram illustrating configuration of main elements of the image forming apparatus according to the embodiment of the present disclosure.

The following explains configuration of the main elements of the image forming apparatus 1. FIG. 3 is a block diagram illustrating configuration of the main elements of the image forming apparatus 1.

An operation section 47 receives input from a user pertaining to various operations and processes that can be performed by the image forming apparatus 1. The operation section 47 includes a plurality of instruction keys 471 and a display 473 (refer to FIG. 1). The display 473 includes a liquid-crystal display or an organic electroluminescence display and displays various screen images such as a menu screen image. The display 473 displays the various screen images under the control of a display control section 102 of the control unit 10 which is explained further below.

The instruction keys 471 are operated by the user in response to a menu displayed by the display 473. The instruction keys 471 for example include a menu key for calling up a menu, arrow keys for moving the focus of a GUI that forms the menu, an enter key for confirming an operation with respect to the GUI forming the menu, character input keys for inputting characters, and number keys for inputting numbers.

An image processing section 31 performs image processing, in accordance with necessity thereof, on image data of an image scanned by the document scanning section 5. The image processing section 31 for example performs predetermined image processing such as shading correction in order to improve image quality when the image forming section 12 performs image formation with respect the image scanned by the document scanning section 5.

An image memory 32 temporarily stores image data that is generated through scanning by the document scanning section 5 and also temporarily stores data that is a printing target for the image forming section 12.

A hard disk drive (HDD) 33 is used to store, for example, image data that is output from the document scanning section 5.

A network interface section 91 includes a communication module such as a LAN board. The network interface section 91 performs transmission and reception of various types of data with a computer or the like via a LAN that is connected to the network interface section 91.

The control unit 10 includes a central processing unit (CPU), random access memory (RAM), and read only memory (ROM). The control unit 10 implements functions of the control section 100, the operation control section 101, the display control section 102, and the reception section 103 through execution of a control program by the CPU. The control program includes a duplex printing control program and is for example stored in the ROM or the HDD 33. Note that instead of the control section 100, the operation control section 101, the display control section 102, and the reception section 103 of the control unit 10 being implemented through operations based on the control program, the control section 100, the operation control section 101, the display control section 102, and the reception section 103 may each be implemented by hardware circuitry.

The control section 100 controls overall operation of the image forming apparatus 1.

The operation control section 101 for example controls operation of the image forming section 12, the sheet feed section 14, and the sheet conveyance section 19. The operation control section 101 causes formation of an image on a sheet P based on image data indicated by an image formation instruction (job) received by the reception section 103. Detailed explanation of a process performed by the operation control section 101 is provided further below.

The display control section 102 controls the display 473 to display various screen images.

The reception section 103 receives input from a user pertaining to image formation through the operation section 47.

Figure 4:
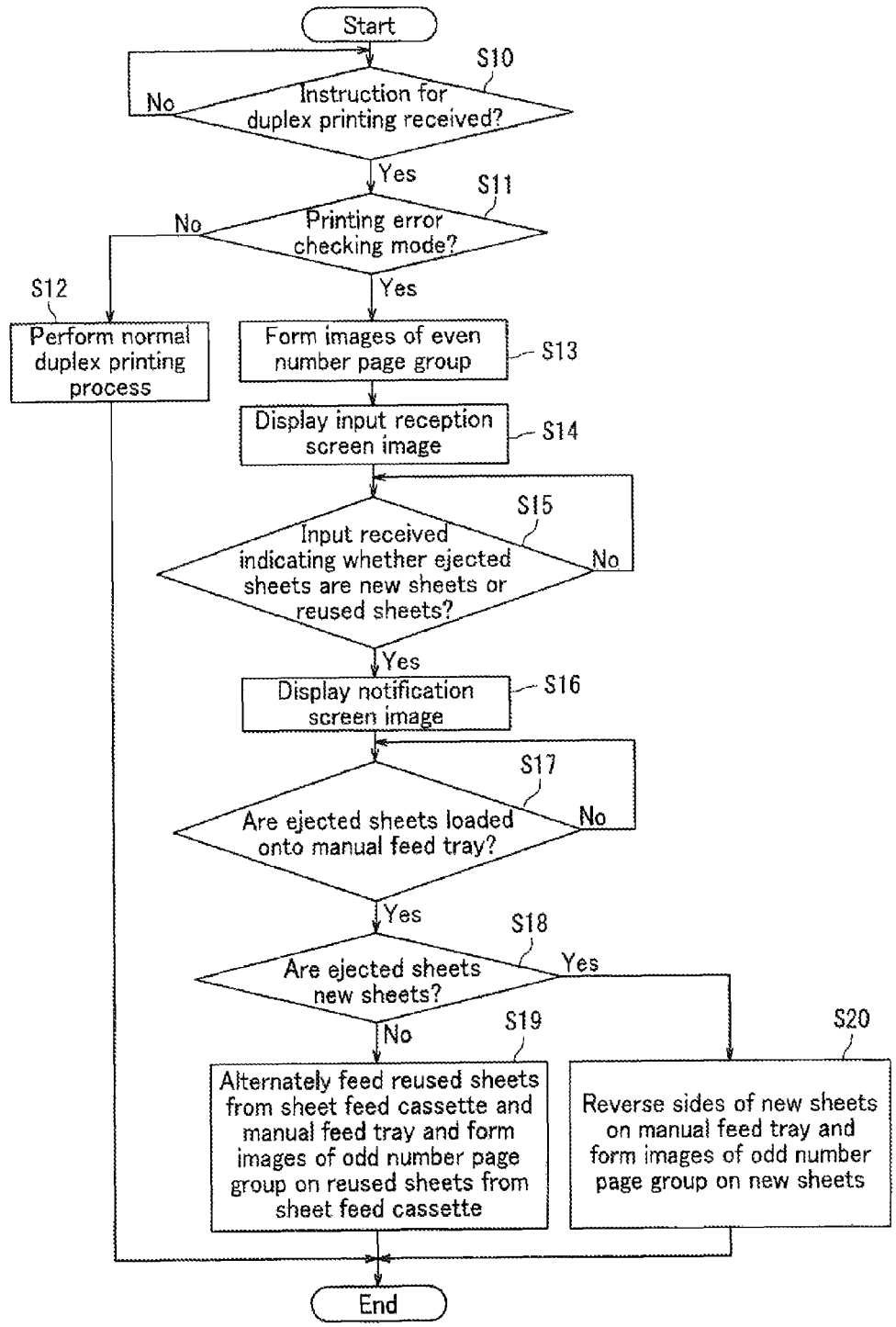
FIG. 4 is a flowchart illustrating a process performed by the image forming apparatus according to the embodiment of the present disclosure.
Figure 5A:
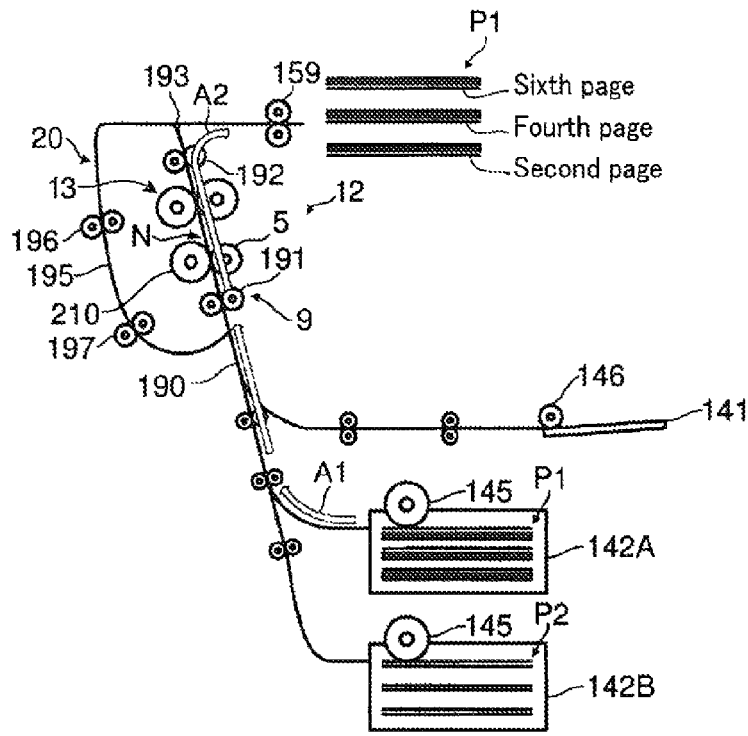
FIGS. 5A and 5B illustrate the movement of reused sheets when a sheet feed cassette storing reused sheets is selected in a printing error checking mode according to the embodiment of the present disclosure.
Figure 5B:
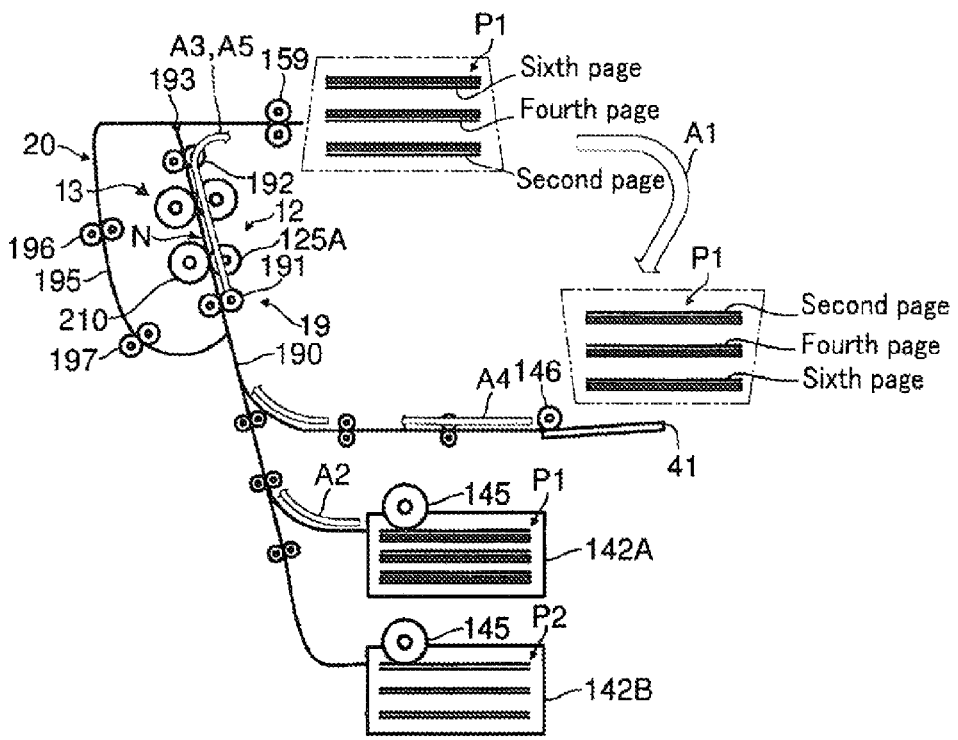
Figure 6A:
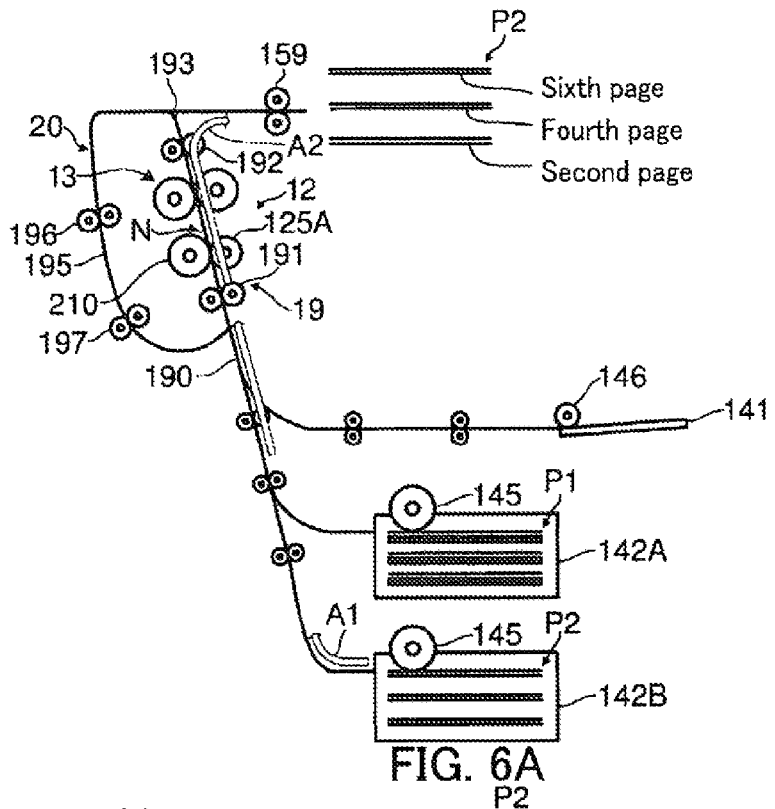
FIGS. 6A and 6B illustrate the movement of new sheets when a sheet feed cassette storing new sheets is selected in the printing error checking mode according to the embodiment of the present disclosure.
Figure 6B:
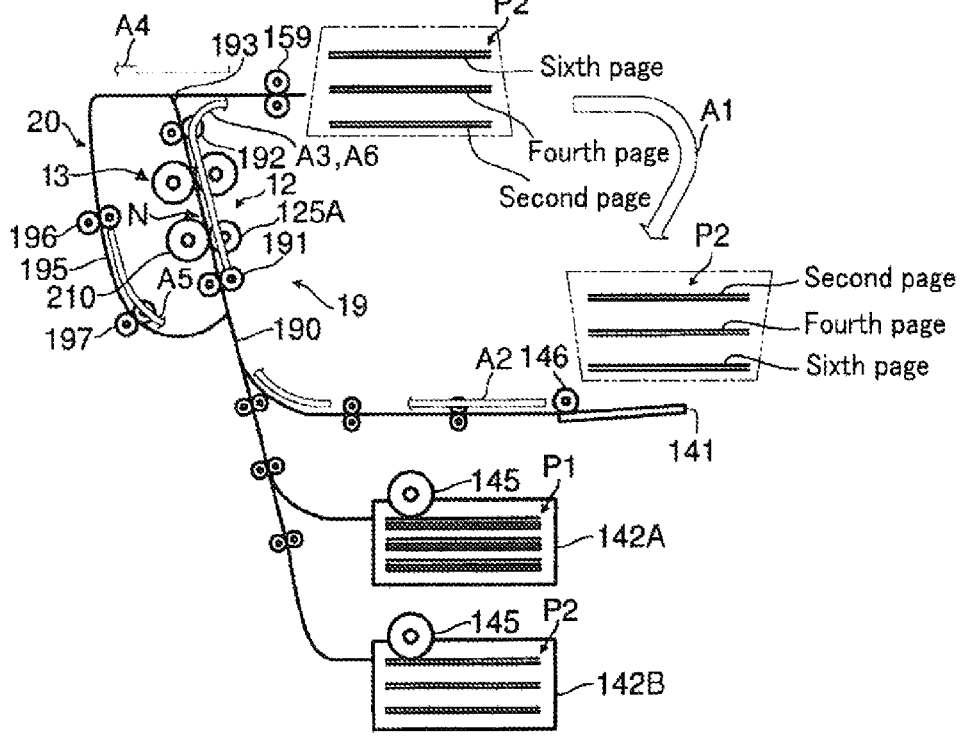

The following explains operation of the image forming apparatus 1. FIG. 4 is a flowchart illustrating a process performed by the image forming apparatus 1. FIGS. 5A and 5B illustrate the movement of reused sheets P1 when the sheet feed cassette 142A storing reused sheets P1 is selected in the printing error checking mode. FIGS. 6A and 6B illustrate the movement of new sheets P2 when the sheet feed cassette 142B storing new sheets P2 is selected in the printing error checking mode. The following explains an example in which duplex printing of images is performed based on image data of six pages.

The reception section 103 determines whether or not an instruction that instructs printing of images on both sides of sheets P (referred to below as a duplex printing instruction) is received (Step S10).

Figure 7:
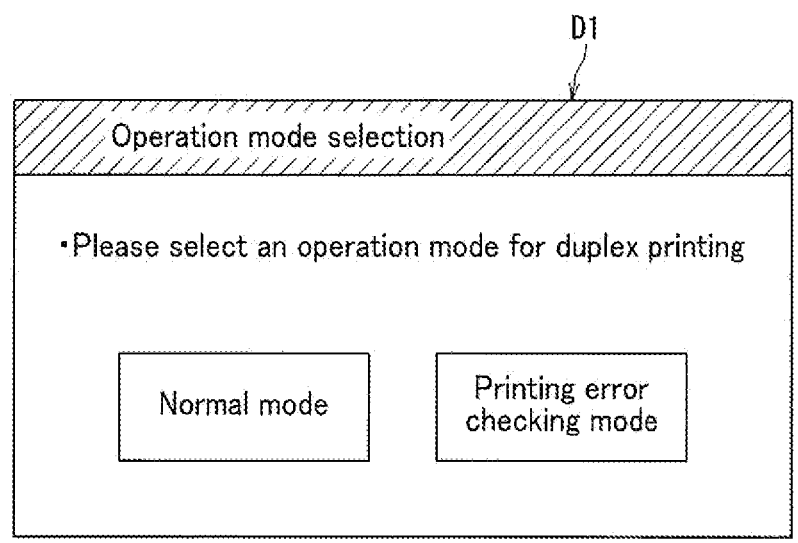
FIG. 7 illustrates a selection screen image displayed by a display of the image forming apparatus according to the embodiment of the present disclosure.

When a duplex printing instruction is received (Step S10: Yes), the operation control section 101 determines whether an operating mode for duplex printing is the normal mode or the printing error checking mode (Step S11). The operating mode for duplex printing is set in advance based on an instruction from the user that is input through the operation section 47. The display 473 for example displays a selection screen image D1 illustrated in FIG. 7 in accordance with an instruction from the display control section 102. The reception section 103 receives a setting for the operating mode for duplex printing based on an instruction from the user that is input through the selection screen image D1.

When the operating mode for duplex printing is set as the normal mode (Step S11: No), the operation control section 101 executes a normal duplex printing process (Step S12). The normal duplex printing process is a commonly known technique; therefore, explanation of the process is omitted.

When the operating mode for duplex printing is set as the printing error checking mode (Step S11: Yes), the operation control section 101 controls the sheet feed section 14 to feed sheets P that are stored in a sheet feed cassette 142 indicated by the instruction received in Step S10. Next, the operation control section 101 controls the sheet conveyance section 19 to convey the sheets P along the conveyance path 190. Also, the operation control section 101 controls the image forming section 12 to form images on respective first sides of the sheets P based on image data of an even number page group among image data indicated by the instruction received in Step S10 (Step S13). In the example illustrated in FIG. 5A, reused sheets P1 stored in the sheet feed cassette 142A are fed by the sheet feed roller 145 (arrow A1 in FIG. 5A) and images are formed on unprinted sides of the reused sheets P1 (arrow A2 in FIG. 5A) based on the image data of the even number page group (second, fourth, and sixth pages). Next, the reused sheets P1 are ejected onto the exit tray 151 such that the first sides on which the images have been formed are facing downward (so called "face-down ejection"). In the example illustrated in FIG. 6A, new sheets P2 stored in the sheet feed cassette 142B are fed by the sheet feed roller 145 (arrow A1 in FIG. 6A) and images are formed on the respective first sides of the new sheets P2 (arrow A2 in FIG. 6B) based on the image data of the even number page group (second, fourth, and sixth pages). Next, the new sheets P2 are ejected onto the exit tray 151 such that the first sides on which the images have been formed are facing downward.

Figure 8A:
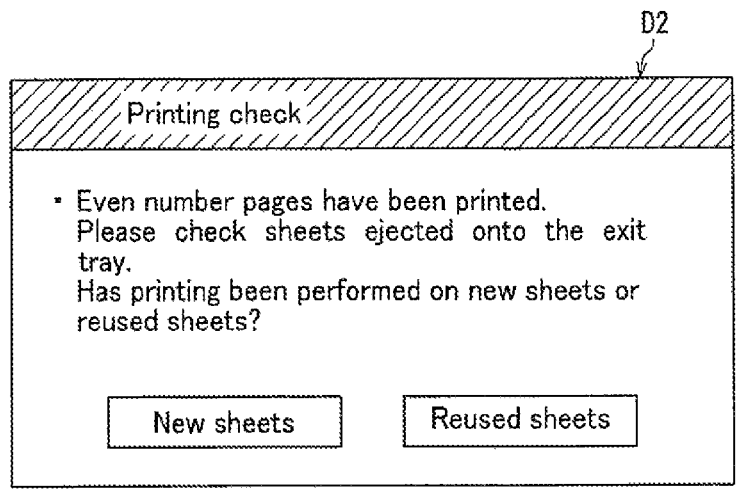
FIG. 8A illustrates an input reception screen image displayed by the display of the image forming apparatus according to the embodiment of the present disclosure.

Once the reused sheets P1 or the new sheets P2 have been ejected, the display control section 102 controls the display 474 to display an input reception screen image D2 (refer to FIG. 8A) (Step S14). The input reception screen image D2 is a screen image prompting input indicating whether sheets ejected onto the exit tray 151 after the images have been formed on the first sides thereof are new sheets P2 having unused second sides or reused sheets P1 having used second sides.

Once the input reception screen image D2 is displayed, the reception section 103 determines whether or not input is received indicating whether the sheets ejected onto the exit tray 151 after the images have been formed on the first sides thereof are new sheets having unused second sides or reused sheets having used second sides (Step S15).

Figure 8B:
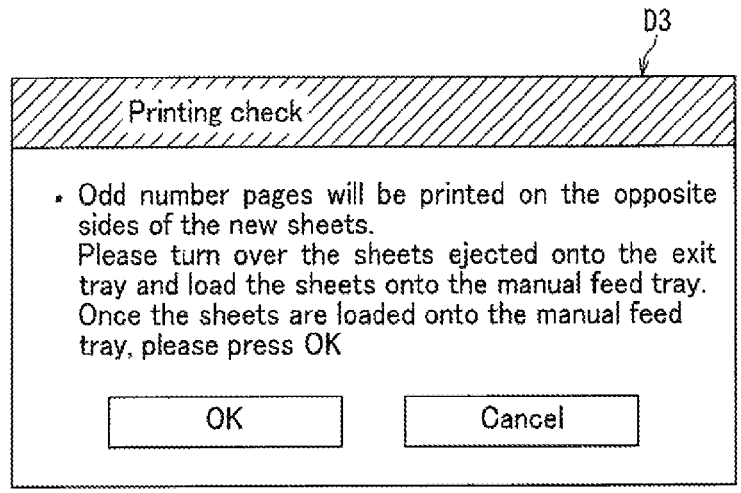
FIGS. 8B and 8C each illustrate a notification screen image displayed by the display of the image forming apparatus according to the embodiment of the present disclosure.
Figure 8C:
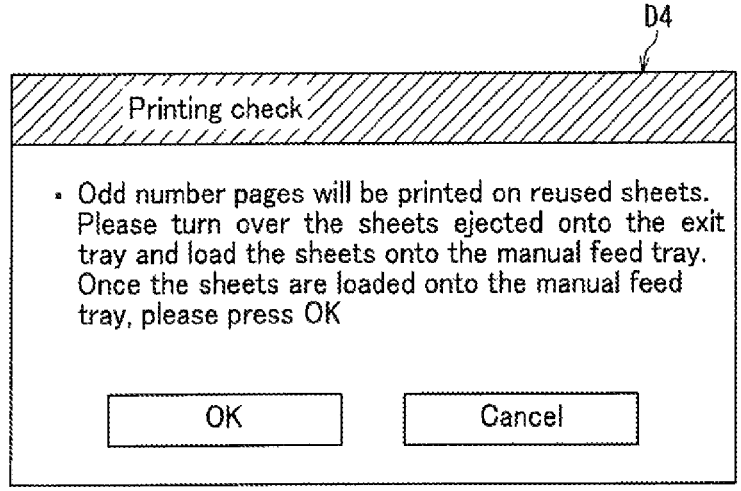

When the aforementioned input is received (Step S15: Yes), the display control section 102 controls the display 473 to display a notification screen image D3 or a notification screen image D4 (refer to FIGS. 8B and 8C) (Step S16). The notification screen images D3 and D4 are screen images that instruct the user to turn over the sheets that have been ejected onto the exit tray 151 and to load the turned-over sheets onto the manual feed tray 141. The display 473 displays the notification screen image D3 in a situation in which the input received in Step S15 indicates that the sheets ejected onto the exit tray 151 after the images have been formed on the first sides thereof are new sheets P2 having unused second sides. On the other hand, the display 473 displays the notification screen image D4 in a situation in which the input received in Step S15 indicates that the sheets ejected onto the exit tray 151 after the images have been formed on the first sides thereof are reused sheets P1 having used second sides.

Once the notification screen image D3 or the notification screen image D4 is displayed, the operation control section 101 determines whether or not the sheets ejected onto the exit tray 151 have been loaded onto the manual feed tray 141 (Step S17). More specifically, text is displayed in the notification screen images D3 and D4 that instructs pressing of an OK button once the sheets P have been loaded onto the manual feed tray 141. The operation control section 101 determines that the sheets ejected onto the exit tray 151 have been loaded onto the manual feed tray 141 upon the user selecting the OK button. Note that alternatively a sensor may be provided above the manual feed tray 141 that detects whether or not sheets are loaded onto the manual feed tray 141. In such a configuration, the operation control section 101 determines that the sheets ejected onto the exit tray 151 have been loaded onto the manual feed tray 141 based on a signal output by the sensor.

When the operation control section 101 determines that the sheets P ejected onto the exit tray 151 have been loaded onto the manual feed tray 141 (Step S17: Yes), the operation control section 101 executes a process for forming images based on image data of an odd number page group among the image data indicated by the instruction received in Step S10 (Steps S18-S20).

When the input received in the Step S15 of the process indicates that the sheets ejected onto the exit tray 151 are reused sheets P1 on which the images have been formed on the unprinted sides thereof (Step S18: No), the operation control section 101 controls the sheet feed section 14 to alternately feed reused sheets P1 stored in the sheet feed cassette 142A and the reused sheets P1 loaded onto the manual feed tray 141. Also, the operation control section 101 controls the image forming section 12 to form images on the reused sheets P1 fed from the sheet feed cassette 142A (Step S19). More specifically, the operation control section 101 controls the image forming section 12 to form images based on the image data of the odd number page group at times at which the reused sheets P1 stored in the sheet feed cassette 142A are fed by the sheet feed section 14. The operation control section 101 controls the sheet conveyance section 19 to eject the aforementioned reused sheets P1 onto the exit tray 151 after the images have been formed thereon by the image forming section 12. On the other hand, the operation control section 101 controls the image forming section 12 to not form images at times at which the reused sheets P1 loaded onto the manual feed tray 141 are fed by the sheet feed section 14. The operation control section 101 controls the sheet conveyance section 19 to eject the aforementioned reused sheets P1 onto the exit tray 151 without images being formed thereon by the image forming section 12.

In the example illustrated in FIG. 5B, the reused sheets P1 ejected onto the exit tray 151 have been turned over and loaded onto the manual feed tray 141 by the user (arrow A1 in FIG. 5B). As explained further above, the reused sheets P1 ejected onto the exit tray 151 are ejected such that the first sides on which the images have been formed are facing downward. Therefore, when the reused sheets P1 are turned over and loaded onto the manual feed tray 141, the reused sheets P1 are loaded onto the manual feed tray 141 such that the first sides on which the images have been formed are facing upward. One of the reused sheets P1 stored in the sheet feed cassette 142A is subsequently fed by the sheet feed roller 145 (arrow A2 in FIG. 5B) and an image is formed on an unprinted side of the reused sheet P1 (arrow A3 in FIG. 5B) based on image data of an odd number page (first page). The reused sheet P1 is then ejected onto the exit tray 151 such that the side of the reused sheet P1 on which the image (first page) has been formed is facing downward. After the reused sheet P1 having the image formed based on the image data of the first page thereon is ejected onto the exit tray 151, one of the reused sheets P1 loaded onto the manual feed tray 141 that has an image formed based on image data of an even number page (second page) thereon, is fed by the sheet feed roller 146 (arrow A4 in FIG. 5B). After the reused sheet P1 is fed from the manual feed tray 141, the reused sheet P1 is ejected onto the exit tray 151, without another image being formed thereon by the image forming section 12 (arrow A5 in FIG. 5B), such that the side of the reused sheet P1 on which the image (second page) has been formed is facing downward. Through repetition of the above process, reused sheets P1 are ejected onto the exit tray 151 such that images formed on the reused sheets P1 are arranged in page order and such that the sides of the reused sheets P1 on which the images have been formed are facing downward.

In a generic image forming apparatus, when a sheet feed cassette storing reused sheets is mistakenly selected during duplex printing, images are formed over printed sides of the reused sheets resulting in wasteful consumption of sheets. In contrast, in the image forming apparatus 1 according to the present embodiment, when a sheet feed cassette storing reused sheets is mistakenly selected during duplex printing, images are not formed over printed sides of the reused sheets and thus sheets are not wastefully consumed.

On the other hand, when the input received in Step S15 indicates that the sheets ejected onto the exit tray 151 after the images have been formed on the first sides thereof are new sheets P2 having unused second sides (Step S18: Yes), the operation control section 101 executes the following process (Step S20). First, the operation control section 101 controls the sheet conveyance section 19 to reverse the sides (front and rear sides) of the new sheets P2 that are loaded onto the manual feed tray 141. Next, the operation control section 101 controls the image forming section 12 to form images on the new sheets P2 based on the image data of the odd number page group.

In the example illustrated in FIG. 6B, the new sheets P2 ejected onto the exit tray 151 have been turned over and loaded onto the manual feed tray 141 by the user (arrow A1 in FIG. 6B). As explained further above, the new sheets P2 ejected onto the exit tray 151 are ejected such that the first sides on which the images have been formed are facing downward. Therefore, when the new sheets P1 are turned over and loaded onto the manual feed tray 141, the new sheets P2 are loaded onto the manual feed tray 141 such that the first sides on which the images have been formed are facing upward. Next, the new sheets P2 loaded onto the manual feed tray 141, which have the images based on the image data of the even number pages (second, fourth, and sixth pages) formed thereon, are fed by the sheet feed roller 146 (arrow A2 in FIG. 6B). The new sheets P2 fed from the manual feed tray 141 are switched back by the ejection roller pair 159 (arrow A4 in FIG. 6B) without images being formed thereon by the image forming section 12 (arrow A3 in FIG. 6B). The new sheets P2 that have been switched back are fed into the reverse conveyance path 195 (arrow A5 in FIG. 6B). Through the above process, the sides of the new sheets P2 are reversed. The new sheets P2 are then conveyed back to the position upstream of the nip N and the fixing section 13 in terms of the sheet conveyance direction and images are formed on the second sides of the new sheets P2 (arrow A6 in FIG. 6B) based on the image data of the odd number page group (first, third, and fifth pages). Once duplex printing on the new sheets P2 is complete, the new sheets P2 are ejected onto the exit tray 151 by the ejection roller pair 159.

Therefore, when a sheet feed cassette storing new sheets P2 is correctly selected during duplex printing, duplex printing can be performed on the new sheets P2 through the above process. The new sheets P2 can also be ejected onto the exit tray 151 such that a side having an image of the first page formed thereon is facing downward and such that the images formed on the new sheets P2 are arranged in page order.

<Supplementary Explanation 1>

The above embodiment was explained for an example in which the sheets ejected onto the exit tray 151 are turned over and loaded onto the manual feed tray 141 by the user. The following explains an example in which the sheets ejected onto the exit tray 151 are loaded onto the manual feed tray 141 by the user without being turned over.

Figure 9A:
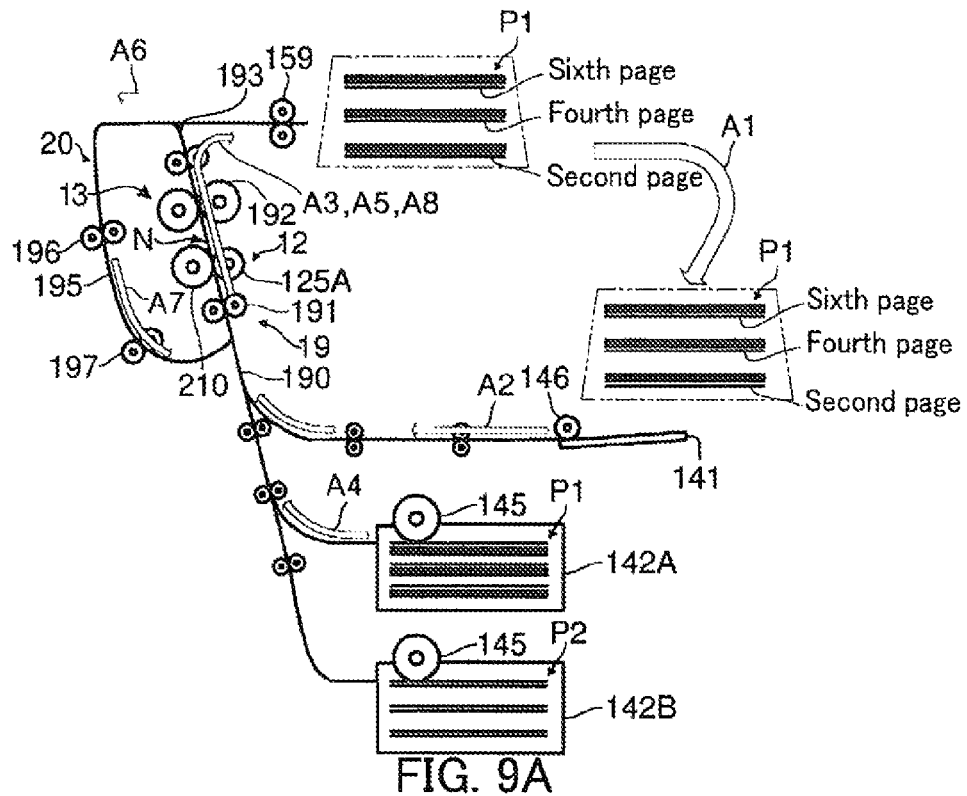
FIG. 9A illustrates the movement of reused sheets when a user loads sheets that have been ejected onto an exit tray onto a manual feed tray without turning over the sheets in a situation in which a sheet feed cassette storing reused sheets is selected in an image forming apparatus according to Supplementary Explanation 1.

FIG. 9A illustrates the movement of reused sheets P1 when the sheet feed cassette 142A storing reused sheets P1 is selected and sheets ejected onto the exit tray 151 are loaded onto the manual feed tray 141 without being turned over.

In the example illustrated in FIG. 9A, reused sheets P1 that are ejected onto the exit tray 151 are loaded onto the manual feed tray 141 without being turned over (arrow A1 in FIG. 9A). As explained further above, the reused sheets P1 ejected onto the exit tray 151 are ejected such that the first sides on which the images have been formed are facing downward. Therefore, the reused sheets P1 are loaded onto the manual feed tray 141 such that the first sides on which the images have been formed are facing downward. Once the reused sheets P1 are loaded onto the manual feed tray 141, one of the reused sheets P1 having an image formed thereon based on image data of an even number page (sixth page) is fed by the sheet feed roller 146 (arrow A2 in FIG. 9A). The reused sheet P1 that is fed from the manual feed tray 141 is ejected onto the exit tray 151, without another image being formed thereon by the image forming section 12 (arrow A3 in FIG. 9A), such that the first side on which the image (sixth page) has been formed is facing upward. After the reused sheet P1 having the image formed thereon based on the image data of the sixth page has been ejected onto the exit tray 151, a reused sheet P1 stored in the sheet feed cassette 142A is fed by the sheet feed roller 145 (arrow A4 in FIG. 9A). Next, the image forming section 12 forms an image on an unprinted side of the reused sheet P1 (arrow A5 in FIG. 9A) based on image data of an odd number page (fifth page). After the image has been formed on the reused sheet P1, the reused sheet P1 is switched back by the ejection roller pair 159 (arrow A6 in FIG. 9A). The reused sheet P1 is then fed into the reverse conveyance path 195 (arrow A7 in FIG. 9A). Through the above, the sides of the reused sheet P1 are reversed. The reused sheet P1 is conveyed back to the position upstream of the nip N and the fixing section 13 in terms of the sheet conveyance direction. Next, the reused sheet P1 is ejected onto the exit tray 151 by the ejection roller pair 159 without another image being formed thereon by the image forming section 12 (arrow A8 in FIG. 9A). Through the above, the reused sheet P1 is stacked on the exit tray 151 such that the side on which the image (fifth page) has been formed is facing upward. Through repetition of the above process, reused sheets P1 can be ejected onto the exit tray 151 such that the sides of the reused sheets P1 on which the images have been formed are facing upward (so called "face-up ejection") and such that the images formed on the reused sheets P1 are arranged in page order.

Figure 9B:
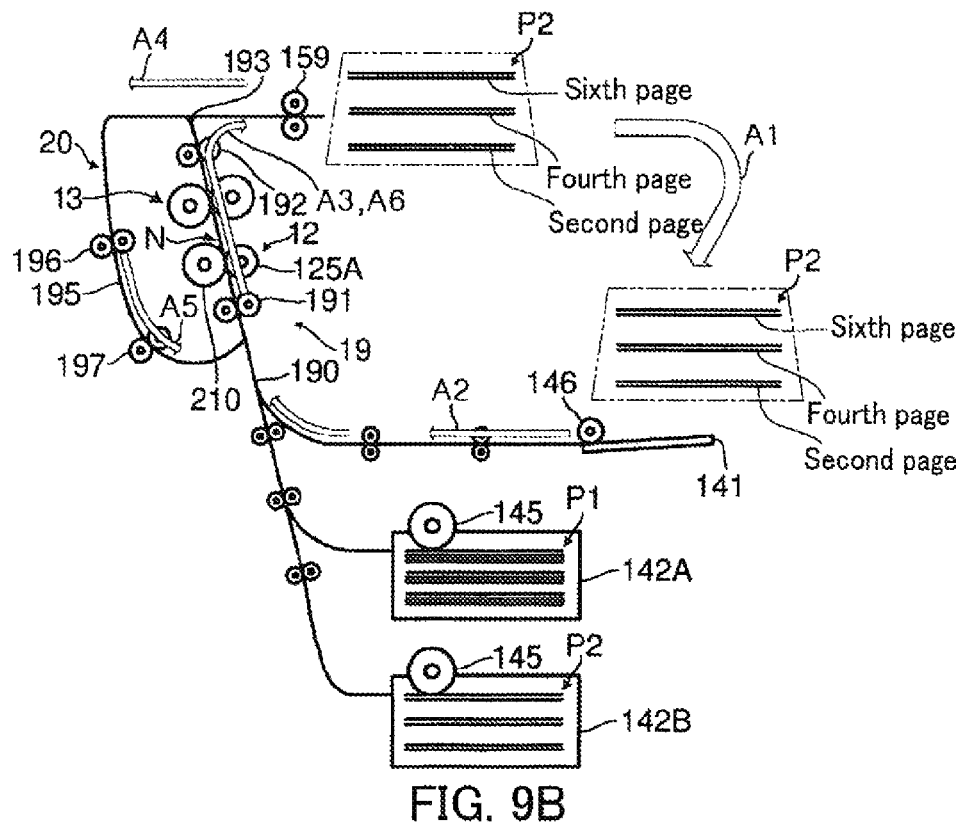
FIG. 9B illustrates the movement of new sheets when a user loads sheets that have been ejected onto the exit tray onto the manual feed tray without turning over the sheets in a situation in which a sheet feed cassette storing new sheets is selected.

FIG. 9B illustrates the movement of new sheets P2 when the sheet feed cassette 142B storing new sheets P2 is selected and sheets ejected onto the exit tray 152 are loaded onto the manual feed tray 141 without being turned over.

In the example illustrated in FIG. 9B, new sheets P2 that are ejected onto the exit tray 151 are loaded onto the manual feed tray 141 by the user without being turned over (arrow A1 in FIG. 9B). As explained further above, the new sheets P2 ejected onto the exit tray 151 are ejected such that the first sides on which the images have been formed are facing downward. Therefore, the new sheets P2 are loaded onto the manual feed tray 141 such that the first sides on which the images have been formed are facing downward. Next, the new sheets P2 loaded onto the manual feed tray 141, which have the images formed thereon based on the image data of the even number page group (second, fourth, and sixth pages), are fed by the sheet feed roller 146 (arrow A2 in FIG. 9B). The image forming section 12 forms images on the new sheets P2 fed from the manual feed tray 141 (arrow A3 in FIG. 9B) based on the image data of the odd number page group (first, third, and fifth pages). After the images have been formed on the new sheets P2, the new sheets P2 are switched back by the ejection roller pair 159 (arrow A4 in FIG. 9B). Next, the new sheets P2 are fed into the reverse conveyance path 195 (arrow A5 in FIG. 9B), thereby reversing the sides of the new sheets P2. The new sheets P2 are conveyed back to the position upstream of the nip N and the fixing section 13 in terms of the sheet conveyance direction and the new sheets P2 are ejected onto the exit tray 151 by the ejection roller pair 159 without images being formed thereon by the image forming section 12 (arrow A6 in FIG. 9B).

Through the process described above, the new sheets P2 can be ejected onto the exit tray 151 such that a side having an image of page 1 formed thereon is facing upward (face-up ejection) and such that the images formed on the new sheets P2 are arranged in page order.

<Supplementary Explanation 2>

In the embodiment and Supplementary Explanation 1 explained above, a configuration is explained in which duplex printing is performed by forming images on sheets P based on image data of an even number page group and subsequently forming images based on image data of an odd number page group once the user has checked the sheets P. The following explains a configuration in which duplex printing is performed by forming images on sheets P based on image data of an odd number page group and forming images based on image data of an even number page group once the user has checked the sheets P.

Figure 10A:
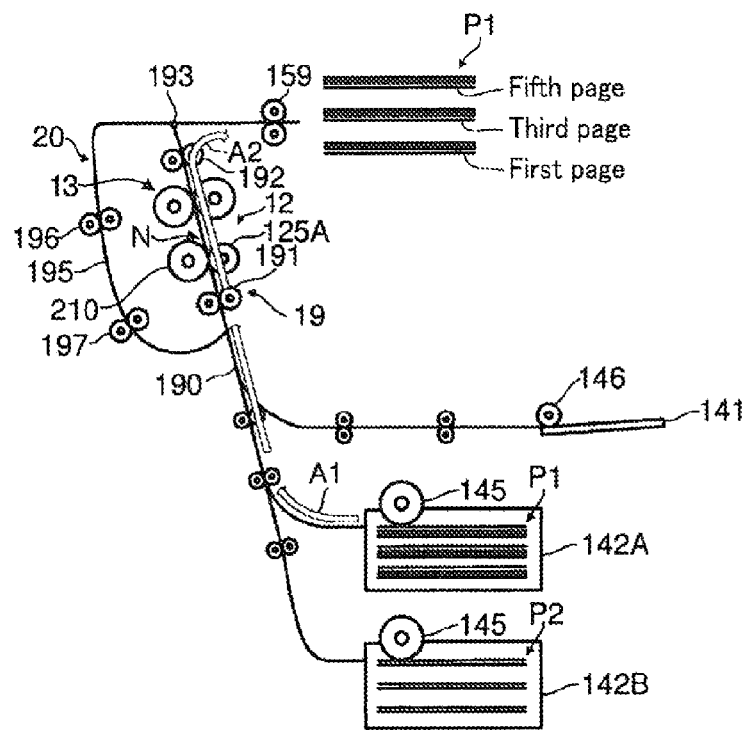
FIGS. 10A and 10B illustrate the movement of reused sheets when a paper feed cassette storing reused sheets is selected in an image forming apparatus according to Supplementary Explanation 2.
Figure 10B:
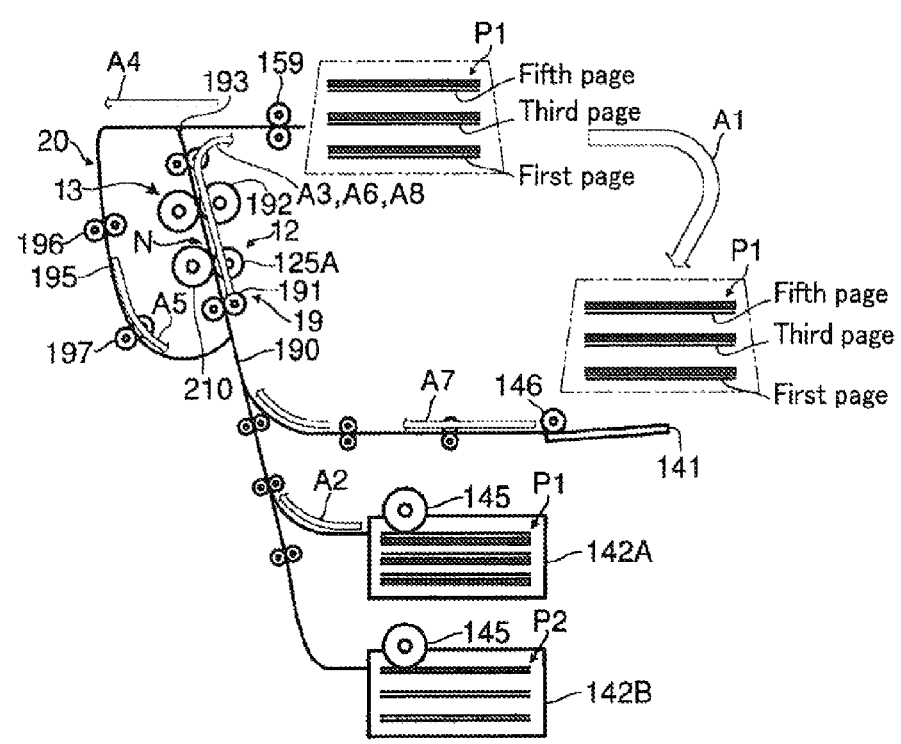

FIGS. 10A and 10B illustrate the movement of reused sheets P1 when the sheet feed cassette 142A storing reused sheets P1 is selected in a printing error checking mode according to Supplementary Explanation 2.

In the example illustrated in FIG. 10A, reused sheets P1 stored in the sheet feed cassette 142A are fed by the sheet feed roller 145 (arrow A1 in FIG. 10A). Images are formed on unprinted first sides of the reused sheets P1 (arrow A2 in FIG. 10A) based on image data of the odd number page group (first, third, and fifth pages). Next, the reused sheets P1 are ejected onto the exit tray 151 such that the first sides on which the images have been formed are facing downward.

In the example illustrated in FIG. 10B, the reused sheets P1 ejected onto the exit tray 151 are loaded onto the manual feed tray 141 by a user without being turned over (arrow A1 in FIG. 10B). As explained above, the reused sheets P1 ejected onto the exit tray 151 are ejected such that the first sides on which the images have been formed are facing downward. Therefore, the reused sheets P1 are loaded onto the manual feed tray 141 such that the first sides on which the images have been formed are facing downward. Next, a reused sheet P1 stored in the sheet feed cassette 142A is fed by the sheet feed roller 145 (arrow A2 in FIG. 10B). An image is formed on an unprinted first side of the reused sheet P1 (arrow A3 in FIG. 10B) based on image data of an even number page (sixth page). The reused sheet P1 is subsequently switched back by the ejection roller pair 159 (arrow A4 in FIG. 10B). Next, the reused sheet P1 is fed into the reverse conveyance path 195 (arrow A5 in FIG. 10B), thereby reversing the sides of the reused sheet P1. The sheet P is conveyed back to the position upstream of the nip N and the fixing section 13 in terms of the sheet conveyance direction. The reused sheet P1 is then ejected onto the exit tray 151 by the ejection roller pair 159 without an image being formed thereon by the image forming section 12 (arrow A6 in FIG. 10B). Through the above, the reused sheet P1 is stacked onto the exit tray 151 such that the first side on which the image (sixth page) has been formed is facing upward. Once the reused sheet P1 having the image formed thereon based on the image data of the sixth page has been ejected onto the exit tray 151, a reused sheet P1 loaded onto the manual feed tray 141 that has an image formed thereon based on image data of an odd number page (fifth page) is fed by the sheet feed roller 146 (arrow A7 in FIG. 10B). The reused sheet P1 fed from the manual feed tray 141 is ejected onto the exit tray 151, without another image being formed thereon by the image forming section 12 (arrow A8 in FIG. 10B), such that the first side having the image (fifth page) formed thereon is facing upward. In other words, image data of the even number page group is printed in descending page order in the process described above. Through repetition of the above process, reused sheets P1 can be ejected onto the exit tray 151 such that first sides of the reused sheets P1 on which the images have been formed are facing upward and such that the images formed on the reused sheets P1 are arranged in page order.

Figure 11A:
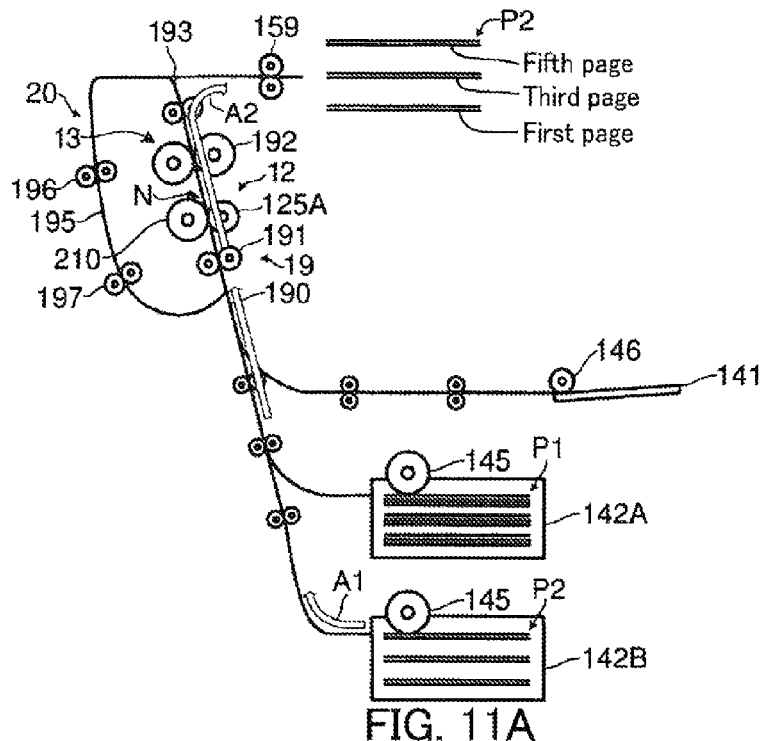
FIGS. 11A and 11B illustrate the movement of new sheets when a paper feed cassette storing new sheets is selected in the image forming apparatus according to Supplementary Explanation 2.
Figure 11B:
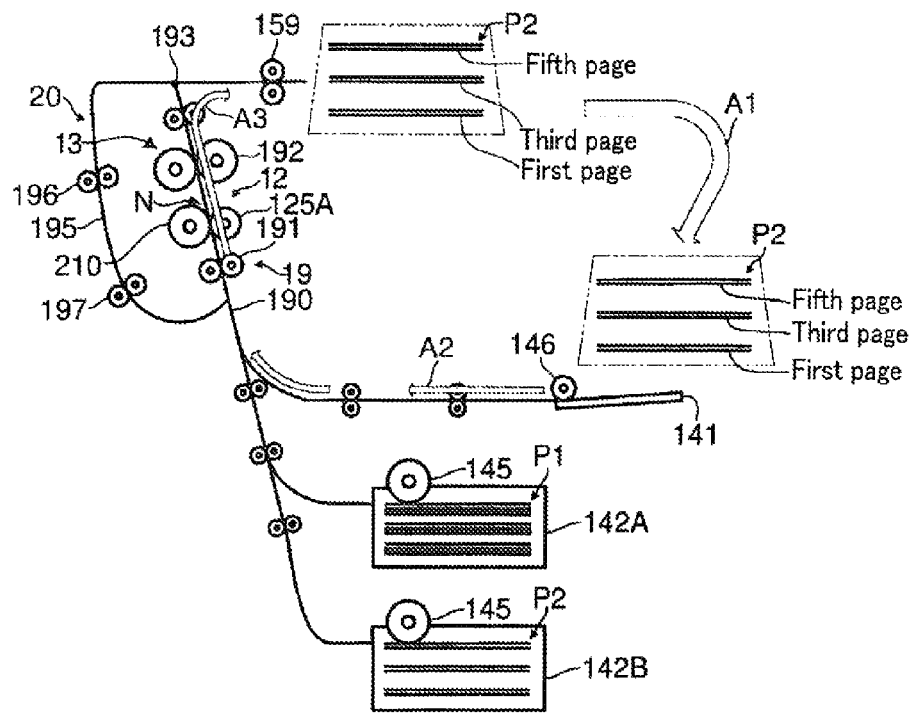

FIGS. 11A and 11B illustrate the movement of new sheets P2 when the sheet feed cassette 142B storing new sheets P2 is selected in the printing error checking mode according to Supplementary Explanation 2.

In the example illustrated in FIG. 11A, new sheets P2 stored in the sheet feed cassette 142B are fed by the sheet feed roller 145 (arrow A1 in FIG. 11A). Next, images are formed on respective first sides of the new sheets P2 (arrow A2 in FIG. 11A) based on image data of the odd number page group (first, third, and fifth pages). The new sheets P2 are subsequently ejected onto the exit tray 151 such that the first sides on which the images have been formed are facing downward.

In the example illustrated in FIG. 11B, the new sheets P2 ejected onto the exit tray 151 are loaded onto the manual feed tray 141 by a user without being turned over (arrow A1 in FIG. 11B). As explained above, the new sheets P2 ejected onto the exit tray 151 are ejected such that the first sides on which the images have been formed are facing downward. Therefore, the new sheets P2 are loaded onto the manual feed tray 141 such that the first sides on which the images have been formed are facing downward. Next, the new sheets P2 loaded onto the manual feed tray 141, which have the images formed thereon based on the image data of the odd number page group (first, third, and fifth pages), are fed by the sheet feed roller 146 (arrow A2 in FIG. 11B). The image forming section 12 forms images on the new sheets P2 fed from the manual feed tray 141 (arrow A3 in FIG. 11C) based on image data of the even number page group (second, fourth, and sixth pages) in descending page order. The new sheets P2 are subsequently ejected onto the exit tray 151 by the ejection roller pair 159. Through the process described above, the new sheets P2 can be ejected onto the exit tray 151 such that a side having an image of the first page formed thereon is facing upward and such that the images formed on the new sheets P2 are arranged in page order.

CONCLUSION

As explained above, in the image forming apparatus 1 according to the embodiment of the present disclosure, when the reception section 103 receives an instruction for duplex image formation on sheets P that indicates one of the sheet feed cassettes 142, the operation control section 101 controls the sheet feed section 14 to feed one or more sheets P stored in the sheet feed cassette 142. Also, the operation control section 101 controls the image forming section 12 to form images on respective first sides of the sheets P based on image data of one group out of an even number page group and an odd number page group among image data indicated by the instruction received by the reception section 103. The operation control section 101 controls the sheet conveyance section 19 to eject the sheets P onto the exit tray 151 after the images have been formed on the first sides thereof by the image forming section 12. The reception section 103 receives input from a user indicating whether the sheets P ejected onto the exit tray 151 after the images have been formed on the first sides thereof are new sheets having unused second sides or reused sheets having used second sides. When the reception section 103 receives input indicating that the sheets P ejected onto the exit tray 151 are the new sheets having the unused second sides and the operation control section 101 determines that the sheets P ejected onto the exit tray have been loaded onto the manual feed tray, the operation control section 101 controls the sheet feed section 14 to feed the sheets P loaded onto the manual feed tray 141. The operation control section 101 controls the image forming section 12 to form images on the second sides of the sheets P fed from the manual feed tray 141 based on image data of the other group out of the even number page group and the odd number page group among the image data indicated by the instruction received by the reception section 103. The operation control section 101 causes the sheet conveyance section 19 to eject the sheets P onto the exit tray 151 after the images have been formed on the second sides thereof by the image forming section 12.

The configuration described above causes the user to check the ejected sheets P after the images are formed on the respective first sides thereof based on the image data of the one group out of the even number page group and the odd number page group. Therefore, even in a situation in which a sheet feed cassette 142 storing reused sheets is mistakenly selected when performing duplex printing, the user can realize that the sheet feed cassette 142 storing reused sheets has been selected before sheets P are wastefully consumed by forming images on printed sides of the reused sheets. Also, in a situation in which a sheet feed cassette 142 storing new sheets is correctly selected when performing duplex printing, duplex printing can be performed on the new sheets.

Also, in the image forming apparatus 1 according to the embodiment of the present disclosure, when the reception section 103 receives input indicating that the sheets P ejected onto the exit tray 151 are the reused sheets having the used second sides and the operation control section 101 determines that the sheets P ejected onto the exit tray 151 have been loaded onto the manual feed tray 141, the operation control section 101 controls the sheet feed section 14 to feed sheets P alternately from the sheet feed cassette 142 and the manual feed tray 141. With respect to sheets P fed from the sheet feed cassette 142 by the sheet feed section 14, the operation control section 101 controls the image forming section 12 to form images on the sheets P based on image data of the other group out of the even number page group and the odd number page group among the image data indicated by the instruction received by the reception section 103. The operation control section 101 also controls the sheet conveyance section 19 to eject the sheets P onto the exit tray 151 after the images have been formed thereon by the image forming section 12. With respect to sheets P fed from the manual feed tray 141 by the sheet feed section 14, the operation control section 101 controls the image forming section 12 to not form an image on the sheets P. The operation control section 101 controls the sheet conveyance section 19 to eject the sheets P onto the exit tray 151 without an image being formed thereon by the image forming section 12.

Through the configuration described above, in a situation in which a sheet feed cassette 142 storing reused sheets is mistakenly selected when performing duplex printing, images can be correctly formed on unprinted sides of the reused sheets without mistakenly forming images on printed sides of the reused sheets.

Furthermore, in the image forming apparatus 1 according to the embodiment of the present disclosure, the sheet conveyance section 19 includes the sheet reversing mechanism 20 for reversing sides of a sheet. When the reception section 103 receives an instruction instructing duplex image formation on sheets P, the operation control section 101 controls the image forming section 12 to form images on respective first sides of the sheets based on image data of the even number page group. Also, when the reception section 103 receives input indicating that the sheets P ejected onto the exit tray 151 are the new sheets having the unused second sides and the operation control section 101 determines that the sheets P ejected onto the exit tray have been loaded onto the manual feed tray 141, the operation control section 101 controls the sheet conveyance section 19 to use the sheet reversing mechanism 20 to reverse the first sides and the second sides of the sheets P loaded onto the manual feed tray 141. The operation control section 101 controls the image forming section 12 to form images on the sheets P based on image data of the odd number page group. Also, when the reception section 103 receives input indicating that the sheets P ejected onto the exit tray 151 are the reused sheets having the used second sides and the operation control section 101 determines that the sheets P ejected onto the exit tray 151 have been loaded onto the manual feed tray 141, with respect to the sheets fed from the sheet feed cassette 142 by the sheet feed section 14, the operation control section 101 controls the sheet conveyance section 19 to not reverse sides of the sheets P. The operation control section 101 also controls the image forming section 12 to form images on the sheets P based on image data of the odd number page group. On the other hand, with respect to the sheets fed from the manual feed tray 141 by the sheet feed section 14, the operation control section 101 controls the sheet conveyance section 19 to eject the sheets P onto the exit tray 151 without reversing the first sides and the second sides of the sheets P.

Through the above configuration, in a situation in which a sheet feed cassette 142 storing reused sheets P1 is mistakenly selected when performing duplex printing, through the user turning over the sheets P ejected onto the exit tray 151 and loading the sheets P onto the manual feed tray 141, the reused sheets P1 can, through a small number of process steps, be ejected onto the exit tray 151 such that sides of the reused sheets P1 on which images have been formed are facing downward and such that the images formed on the reused sheets P1 are arranged in page order. Also, in a situation in which a sheet feed cassette storing new sheets P2 is correctly selected when performing duplex printing, the new sheets P2 can, through a small number of process steps, be ejected onto the exit tray 151 such that a side having an image of a first page formed thereon is facing downward and such that the images formed on the new sheets P2 are arranged in page order.

Note that the present disclosure is of course not limited to the configuration in the above embodiment and various modifications may be made. For example, the image forming apparatus according to the present disclosure is explained in the above embodiment using a multifunction peripheral, but the multifunction peripheral is just one example of the image forming apparatus and the image forming apparatus may for example alternatively be a printer, a copier, or a facsimile machine.

The configurations and processes explained in the above embodiment with references to FIGS. 1 to 11B are merely an example of implementation of the present disclosure, and the present disclosure is not limited to the aforementioned configurations and processes.

What is claimed is:

1. An image forming apparatus comprising:
    a sheet feed section that includes a sheet feed cassette and a manual feed tray and that is configured to feed a sheet stored in the sheet feed cassette or a sheet loaded onto the manual feed tray;
    a sheet conveyance section that is configured to convey the sheet fed by the sheet feed section and that includes a sheet reversing mechanism for reversing sides of the sheet;
    a reception section configured to receive input pertaining to image formation;
    an image forming section configured to form an image on the sheet based on image data indicated by an image formation instruction received by the reception section;
    an exit tray onto which the sheet is ejected after the image has been formed thereon by the image forming section; and
    an operation control section configured to control operation of the sheet feed section, the sheet conveyance section, and the image forming section, wherein
    when the reception section receives an instruction for duplex image formation that indicates the sheet feed cassette, the operation control section:
    controls the sheet feed section to feed one or more sheets from the sheet feed cassette;
    controls the image forming section to form images on respective first sides of the sheets based on image data of one group out of an even number page group and an odd number page group among image data indicated by the instruction received by the reception section; and
    controls the sheet conveyance section to eject the sheets onto the exit tray after the images have been formed on the first sides thereof by the image forming section,
    the reception section is configured to receive input from a user indicating whether the sheets ejected onto the exit tray after the images have been formed on the first sides thereof are new sheets having unused second sides or reused sheets having used second sides, and
    when the reception section receives input indicating that the sheets ejected onto the exit tray are the new sheets having the unused second sides and the operation control section determines that the sheets ejected onto the exit tray have been loaded onto the manual feed tray, the operation control section:
    controls the sheet feed section to feed the sheets loaded onto the manual feed tray;
    controls the image forming section to form images on the second sides of the sheets fed from the manual feed tray based on image data of the other group out of the even number page group and the odd number page group among the image data indicated by the instruction received by the reception section; and
    controls the sheet conveyance section to eject the sheets onto the exit tray after the images have been formed on the second sides thereof by the image forming section.

2. The image forming apparatus according to claim 1, wherein
    when the reception section receives input indicating that the sheets ejected onto the exit tray are the reused sheets having the used second sides and the operation control section determines that the sheets ejected onto the exit tray have been loaded onto the manual feed tray, the operation control section:
    controls the sheet feed section to feed sheets alternately from the sheet feed cassette and the manual feed tray;
    with respect to sheets fed from the sheet feed cassette by the sheet feed section,
        controls the image forming section to form images on the sheets based on the image data of the other group out of the even number page group and the odd number page group among the image data indicated by the instruction received by the reception section, and
        controls the sheet conveyance section to eject the sheets onto the exit tray after the images have been formed thereon by the image forming section; and
    with respect to sheets fed from the manual feed tray by the sheet feed section,
        controls the image forming section to not form an image on the sheets, and
        controls the sheet conveyance section to eject the sheets without an image being formed thereon by the image forming section.

3. The image forming apparatus according to claim 2, wherein
    when the reception section receives the instruction for duplex image formation, the operation control section controls the image forming section to form the images on the respective first sides of the sheets based on image data of the even number page group,
    when the reception section receives input indicating that the sheets ejected onto the exit tray are the new sheets having the unused second sides and the operation control section determines that the sheets ejected onto the exit tray have been loaded onto the manual feed tray, the operation control section:
    controls the sheet conveyance section to use the sheet reversing mechanism to reverse the first sides and the second sides of the sheets loaded onto the manual feed tray; and
    controls the image forming section to form images on the sheets based on image data of the odd number page group after the first sides and the second sides of the sheets have been reversed by the sheet conveyance section, and
    when the reception section receives input indicating that the sheets ejected onto the exit tray are the reused sheets having the used second sides and the operation control section determines that the sheets ejected onto the exit tray have been loaded onto the manual feed tray, the operation control section:
with respect to the sheets fed from the sheet feed cassette by the sheet feed section,
controls the sheet conveyance section to not reverse sides of the sheets,
controls the image forming section to form images on the sheets based on the image data of the odd number page group, and
controls the sheet conveyance section to eject the sheets onto the exit tray; and
with respect to the sheets fed from the manual feed tray by the sheet feed section,
controls the sheet conveyance section to not reverse the first sides and the second sides of the sheets;
controls the image forming section to not form an image on the sheets; and
controls the sheet conveyance section to eject the sheets onto the exit tray.

4. The image forming apparatus according to claim 1, further comprising
a display configured to display an image; and
a display control section configured to control display operation of the display, wherein
after the sheets having the images formed on the first sides thereof have been ejected onto the exit tray by the sheet conveyance section, the display control section controls the display to display an input reception screen image for prompting input from the user indicating whether the sheets ejected onto the exit tray are the new sheets having the unused second sides or the reused sheets having the used second sides.

5. The image forming apparatus according to claim 4, wherein
the display control section controls the display to display a notification screen image that prompts the user to turn over the sheets ejected onto the exit tray and load the sheets onto the manual feed tray.

6. The image forming apparatus according to claim 1, wherein
the sheet feed section includes a plurality of sheet feed cassettes, and
at least one of the plurality of sheet feed cassettes stores reused sheets therein.

7. The image forming apparatus according to claim 6, wherein
the sheet feed cassette from which the sheets are fed is set from among the plurality of sheet feed cassettes based on the instruction received by the reception section.

* * * * *